(12) United States Patent
Tapie et al.

(10) Patent No.: US 8,514,896 B2
(45) Date of Patent: Aug. 20, 2013

(54) DEVICE TO SYNCHRONIZE AUDIO AND VIDEO PULSES IN A RECEIVER

(75) Inventors: Thierry Tapie, Rennes (FR); Serge Defrance, Rennes (FR); Patrick Hardy, Baulon (FR); Bruno Derrien, Domloup (FR)

(73) Assignee: Thomson Licensing (FR)

( * ) Notice: Subject to any disclaimer, the term of this patent is extended or adjusted under 35 U.S.C. 154(b) by 388 days.

(21) Appl. No.: 12/455,549

(22) Filed: Jun. 3, 2009

(65) Prior Publication Data

US 2010/0226394 A1    Sep. 9, 2010

(30) Foreign Application Priority Data

Mar. 6, 2009  (FR) ..................... 09 51439

(51) Int. Cl.
*H04N 5/08*  (2006.01)

(52) U.S. Cl.
USPC ............................ 370/508; 348/521; 725/118

(58) Field of Classification Search
CPC .............. H04N 2005/91314; H04N 21/242; H04N 2005/91371; H04N 5/08
USPC ................ 370/508–510; 348/E5.017, 521; 725/118
See application file for complete search history.

(56) References Cited

U.S. PATENT DOCUMENTS

| | | | |
|---|---|---|---|
| 3,865,973 A * | 2/1975 | Masuda et al. .................. 348/24 |
| 6,690,428 B1 * | 2/2004 | Hudelson et al. ............. 348/461 |
| 7,619,546 B2 * | 11/2009 | McGrath ......................... 341/61 |
| 2004/0239764 A1 * | 12/2004 | Overton et al. ............... 348/180 |
| 2006/0140498 A1 * | 6/2006 | Kudo et al. ................... 382/254 |

* cited by examiner

*Primary Examiner* — Kibrom T Hailu
*Assistant Examiner* — Benjamin Lamont
(74) *Attorney, Agent, or Firm* — Tutunjian & Bitetto, P.C.

(57) ABSTRACT

The present invention relates to a device able to receive packets circulating in a packet-switching network. The packets include information on a synchronization signal. The device is configured for producing first and second pulses synchronous with the synchronization signal. The first and second pulses have different periods, which are integer value multiples of the synchronization signal period.

16 Claims, 7 Drawing Sheets

Prior Art

Prior Art

DEVICE TO SYNCHRONIZE AUDIO AND VIDEO PULSES IN A RECEIVER

SCOPE OF THE INVENTION

The present invention relates to the domain of transport of synchronisation signals on a packet switching network, for example of IP (Internet Protocol) type, whether the network is wired (for example Ethernet (IEEE802.3)) or wireless (for example IEEE 802.6 D-2004). The present invention relates more specifically to devices adapted to receive such synchronisation signals, said signals intended for the transport of images, and being carriers of information on the colour or sound samples associated with said images.

PRIOR ART

The prior art already knows of systems intended to transmit a synchronisation signal commonly called "Genlock" or "Black burst" useful for acquiring or processing images synchronously on different stations connected by a packet switching network. These systems are based on the simultaneous availability on all the stations of a sampling clock. The signal thus conveyed is for example a Genlock signal that carries information from the start of the image (or "top image") repeated every 40 ms, and information from the start of the line repeated every 64 μs. The waveforms of synchronisation signals are a function of the format of the image transmitted on the network. For example, for a high definition image, the signal synchronisation has a tri-level form (−300 mV, 0V, +300 mV).

Such synchronisation signal transmission systems that are able to overcome jitter are described in the international application FR2007/050918 filed on Mar. 13th 2007 and having the publication number WO2007/104891: it concerns counter digital signals or PCR (Program Clock Reference) that are representative of reference clock signals. These very precise digital signals are sent for example to cameras across a network so that they can locally reconstruct clock signals that are in phase with the reference clock. The creation of the digital signal transported on the network and the reconstruction of clock signals are realised according to the sampling clock CLKech common to the transmission device and the reception devices.

Figure 1:
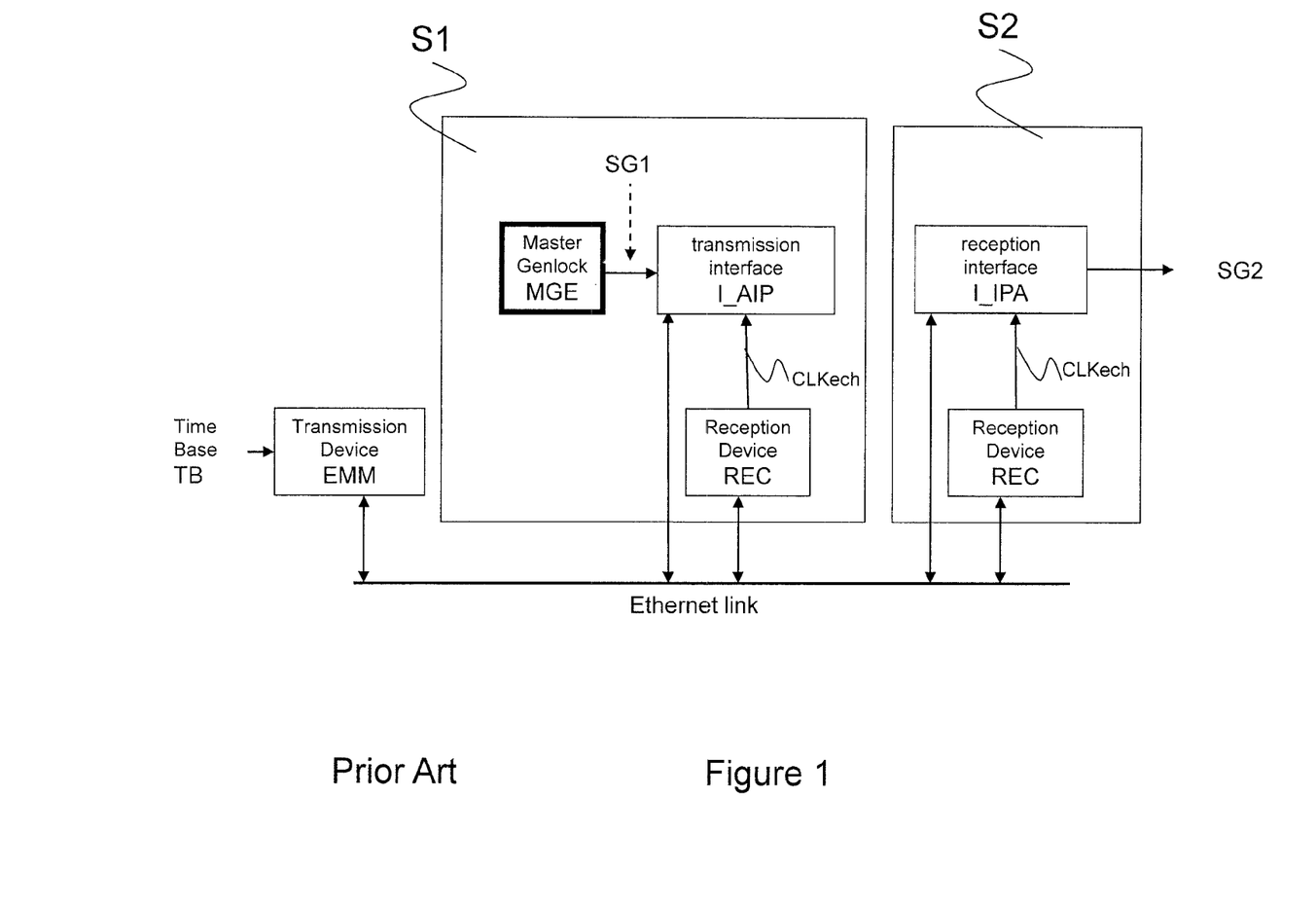
FIG. 1, already described shows an example of use of a reception device according to the invention in a Genlock information transmission system between two items of equipment connected by an IP/Ethernet network, FIG. 2, already described, shows an architecture of a transmission device according to the prior art, FIG. 3, already described, shows an architecture of a reception device according to the prior art, FIG. 4, already described, shows an architecture of a PLL loop of a reception device according to the prior art, FIG. 5, already described, regroups five timing diagrams of the progression of signals produced by a reception device according to the prior art, FIG. 6a, already described, shows the shape of a synchronisation signal corresponding to several successive video lines in PAL system.

FIG. 1 shows the architecture of such a system where a first station S1 is "master" and a second station S2 is "slave". The purpose is thus to generate on the S2 station a synchronisation signal SG2 that is perfectly synchronous with a synchronisation signal SG1 generated by a Master Genlock MGE on station S1.

As described in the international PCT application FR2007/050918, a counting ramp CSE_PCR (not shown in FIG. 1) is generated by a transmission interface I_AIP. This counting ramp CSE_PCR is sampled at precise instances defined by the sampling clock CLKech. The signals resulting from this sampling, the PCR samples are conveyed to the station S2 in synchronisation packets transmitted by S1. These synchronisation packets are received by the station S2 and are employed to reconstitute a counting ramp CSR_PCR synchronous with the counting ramp CSE_PCT of the station S1.

This reconstitution relies in particular on the sampling clock CLKech that is available simultaneously on the stations S1 and S2. In fact, on the stations S1 and S2, a reception device REC, for example an IEEE1588 Slave produces the sampling clock CLKech from temporal markers transmitted via packets. The temporal markers are for example PTP packets that are transmitted on the network by a transmission device EMM supplied by a time base TB, for example a 1588 Master able to transmit such packets, for example according to the protocol PTP.

Figure 2:
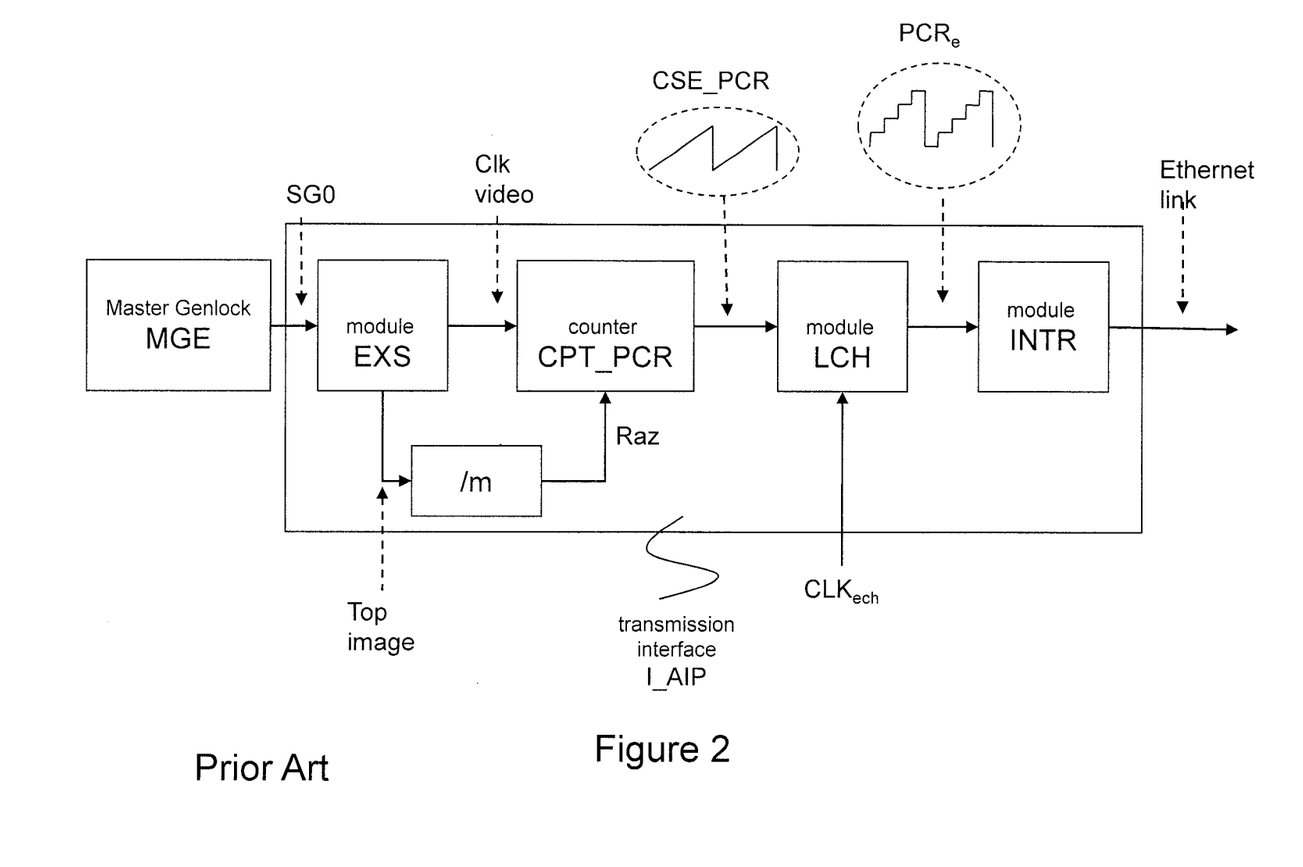

FIG. 2 shows an example of the architecture of the transmission interface I_AIP according to the prior art. What follows presents the processing of the Genlock signal SG1 from the master Genlock MGE, within the transmission interface I_AIP.

First, a module EXS extracts the synchronisation information from the signal SG1 in order to recover a video timing clock (noted as Clk video on FIG. 2). More specifically, the module EXS extracts from SG1 a pulse (or top image) corresponding to the start of an image. Furthermore, the module EXS comprises an image counter, for example a 40 ms counter, which is not shown on FIG. 2. The output of this image counter progresses according to the counting ramp, crossing 0 at each image period, that is every 40 ms in the case of the image counter cited in the aforementioned example.

By "counting ramp" is designated a "stair-step" signal whose steps are of a unitary height. The "counting ramp range" is the term applied to the difference in level between the highest steps and the lowest steps. The image counter is timed by the video timing clock, that is, the "width" of each step corresponds to $1/F_{out}$ where $F_{out}$ is the frequency of the clock Clk video.

The counting ramp range delivered by the image counter is equal to EX=40 ms.$F_{out}$ The image counter successively delivers all of the integer values from 0 to EX_I−1 where EX_I=40 ms.$F_{out}$.

The timing video clock is used to time a counter CPT_PCR. The output of the counter CPT_PCR is a counting ramp CSE_PCR, whose period is equal to m image periods. Every "m" image, the counter CPT_PCR is reset, that is to say that the counting ramp CSE_PCR is reset to 0. The range EX of the counting ramp CSE_PCR is equal to m.40 ms.$F_{out}$. The counter CPT_PCR delivers successively all of the integer values from 0 to EX-1, where EX=m.40 ms.$F_{out}$.

Next, a module LCH samples the counting ramp CSE_PCR according to the sampling clock CLKech to produce samples $PCR_e$. These samples $PCR_e$ are sent across the network and travel to the reception side via a network interface (block INTR).

Figure 3:
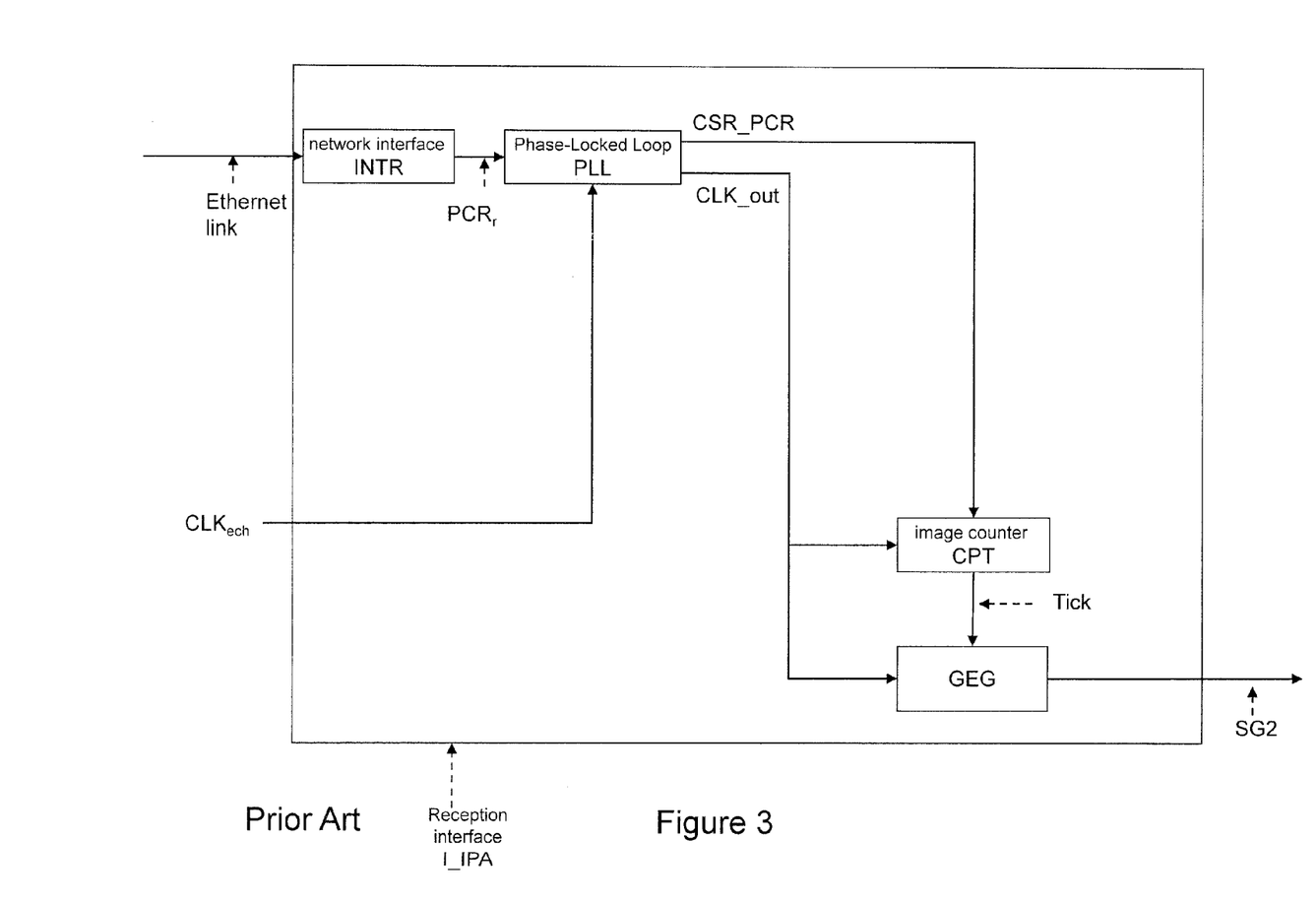

FIG. 3 shows the reception side according to the prior art. The reception interface I_IPA recovers the $PCR_e$ samples that have been sent on the network. These samples $PCR_e$ are received via a network interface (module INTR) with a variable delay linked to the transport between the transmission device and the reception device: the module INTR produces samples $PCR_r$.

The samples $PCR_e$, which are produced at regular intervals defined by the sampling clock CLKech on the transmission side, arrive at irregular intervals on the reception side: this is largely due to the jitter introduced during transport on the network. The samples $PCR_r$ are taken into account at intervals defined by the sampling clock CLKech and hence, the majority of the jitter introduced during packet transport is eliminated. The imprecision between the transmission and reception sampling times is absorbed by a phase-locked loop PLL whose bandwidth is appropriated. The characteristics of the phase-locked loop PLL guarantee a reconstituted clock generation CLK_out with a reduced jitter.

The phase-locked loop PLL acts as a system receiving $PCR_r$ samples and delivering:
  a reconstituted clock CLK_out$_1$,
  a counting ramp CSR_PCR and,
  local samples PCR_loc.

When the loop PLL operates in a steady state, the samples $PCR_r$ are noticeably equal to the samples PCR_loc.

The reconstituted clock CLK_out determines the rhythm of a image counter CPT similar to the image counter on the transmission side, for example a 40 ms counter. The counter CPT is reset each time the counting ramp CSR_PCR crosses 0. Hence, the counter CPT delivers a counting ramp CPT_I with a period of 40 ms. Between two successive resets, the counter CPT progresses freely. The counter also produces a top image Tick that supplies a Genlock local generator, GEG to produce a reconstructed Genlock signal SG2 intended to synchronise an item of equipment on the reception side, for example a camera.

Figure 4:
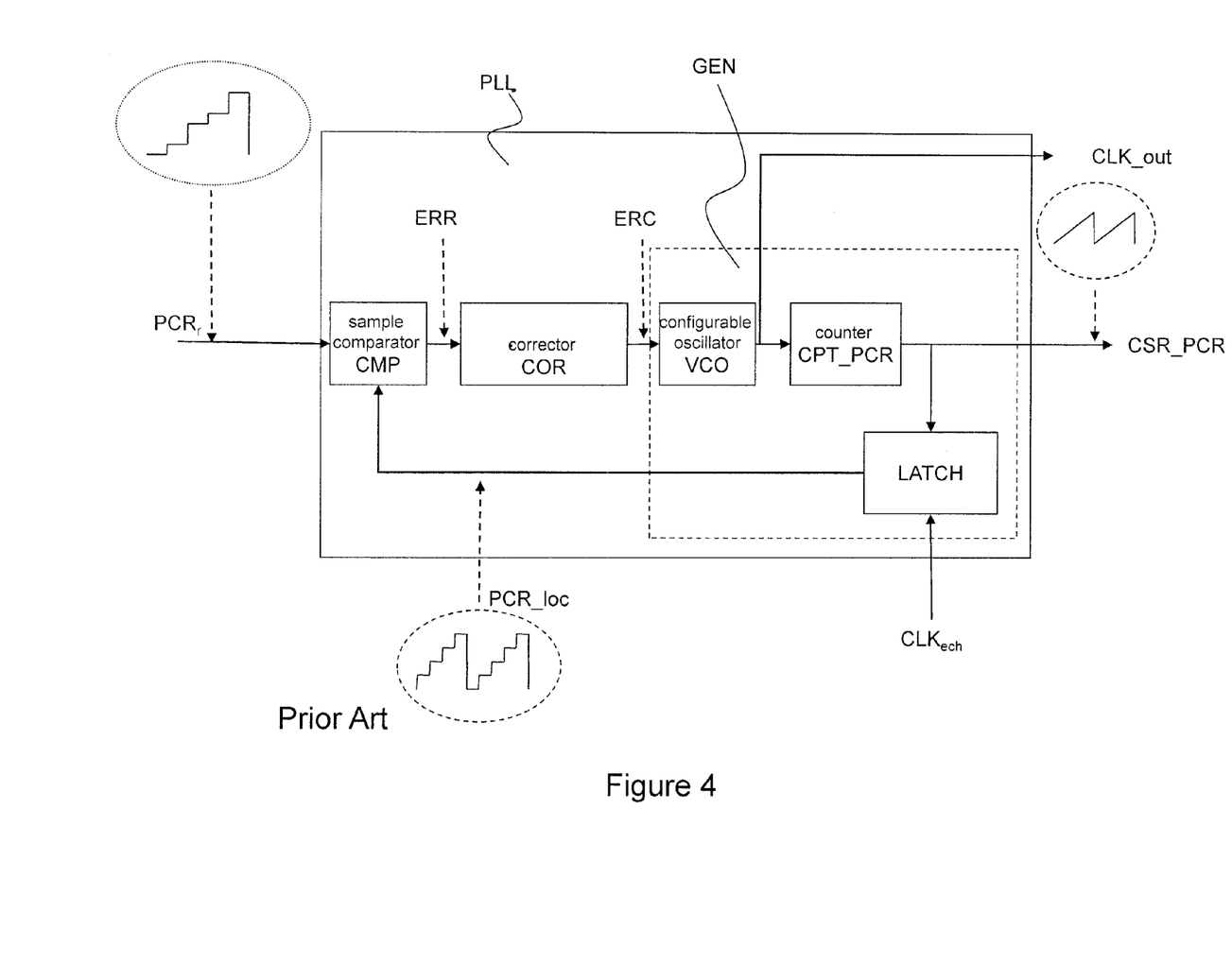

FIG. 4 shows a PLL phase-locked loop architecture used in a reception interface I_IPA according to the prior art. As shown in FIG. 4, the phase-locked loop PLL comprises:
- a sample comparator CMP that compares the $PCR_r$ samples to local samples PCR_Loc and delivers a samples comparison result (signal ERR),
- a corrector COR receiving the signal ERR and delivering a corrected error signal ERC,
- a configurable oscillator VCO receiving the signal ERC and delivering a reconstituted clock CLK_out, the clock CLK_out has a frequency that depends on the signal ERC,
- a counter CPT_PCR that produces a counting ramp CSR_PCR according to a rate that is printed by the reconstituted clock CLK_out,
- a support system with the value LATCH that generates local samples PCR_loc from the values of the counting ramp CSR_PCR at the instants defined by the sampling clock CLKech.

Figure 5:
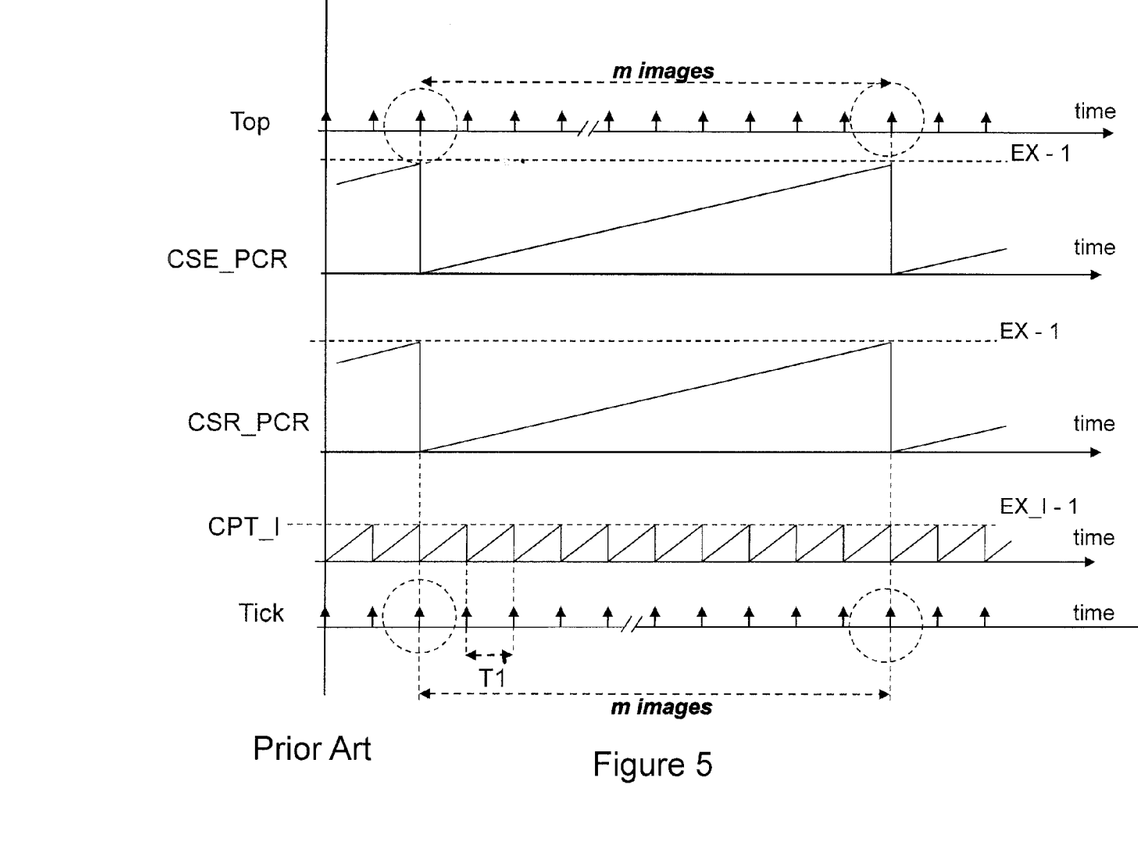

FIG. 5 groups five timing diagrams of signal progressions described above.

The signal Top represents the top image after extraction of the signal SG0 on the transmission side: there is a period T1 equal for example to 40 ms. This top image triggers a reset to zero of the CSE_PCR transmission ramp every m images.

The signal CSE-PCR is the modulo m images counting ramp, for example m=2048. Samples of this counting ramp PCR taken at regular intervals, at the Tech period of the sampling clock CLKech equal for example to 1 second, are transmitted to reception. On the reception side, these samples are taken into account again to supply the phase locked loop PLL that use them and the sampling clock CLKech to create the counting ramp CSR_PCR.

The CSR_PCR signal is the reconstituted counting ramp on the reception side. Its duration is identical to that of the transmission that is to say m.T1. It is known that the passage through 0 of the ramp CSR_PCR corresponds to the start of an image. The passage through zero of the signal CSR_PCR thus resets to zero the counting ramp CPT_I that has a period corresponding to the duration of an image, that is to say here at T1=40 ms. The counting ramp CPT_I progresses freely, it is automatically reset every $F_{out}$.40 ms (for example). It is also compulsorily reset at every passage through zero of the ramp CSR_PCR.

At every reset to zero of the counting ramp CPT_I a first pulse Tick is generated which is perfectly synchronous with the Top pulse. The first pulse Tick can be used to generate a Genlock signal SG2 perfectly synchronous with the Genlock signal SG2 created on the transmission side.

Figure 6A:
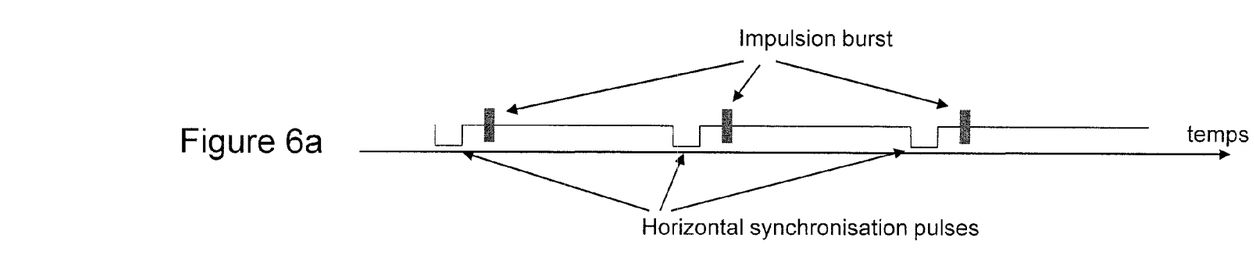

FIG. 6a shows the actual shape of a synchronisation signal corresponding to several successive video lines in PAL system.

In addition to the line start pulses spaced at 64 μs (horizontal synchronisation of the image), the presence of follow-up "colour burst" pulses is noted, that is to say coloured information that are carried by a sub-carrier that has a period that is not necessarily equal to a whole multiple of the image period. For example, for the PAL system, it can be shown that the number of periods of the sub-carrier corresponding to the duration of an image is equal to 17745-¼: That is to a integer value minus 0.25. For two consecutive images, there is a temporal sliding that corresponds to a quarter of the period of the sub-carrier PAL. Following an image start marked by a Top pulse, it is necessary to wait for 4 consecutive images for the sub-carrier to resume its initial phase at the instant corresponding to a new image start. For example in PAL, the coloured information are carried by a sub-carrier with a frequency value of 4.433 MHz. The frequency of the sub-carrier being known a priori, the coloured information are thus perfectly defined by the knowledge of Burst pulses marking a sub-carrier start at phase null corresponding to a top image.

The structure of the signal in PAL standard is similar to that of a signal in NTSC standard: for this latter standard, only the frequency of the sub-carrier differs as well as the number (4 for PAL and 2 for NTSC) of consecutive images (or consecutive first pulses Tick) that must be waited for before the sub-carrier finds a null phase again.

Figure 6B:
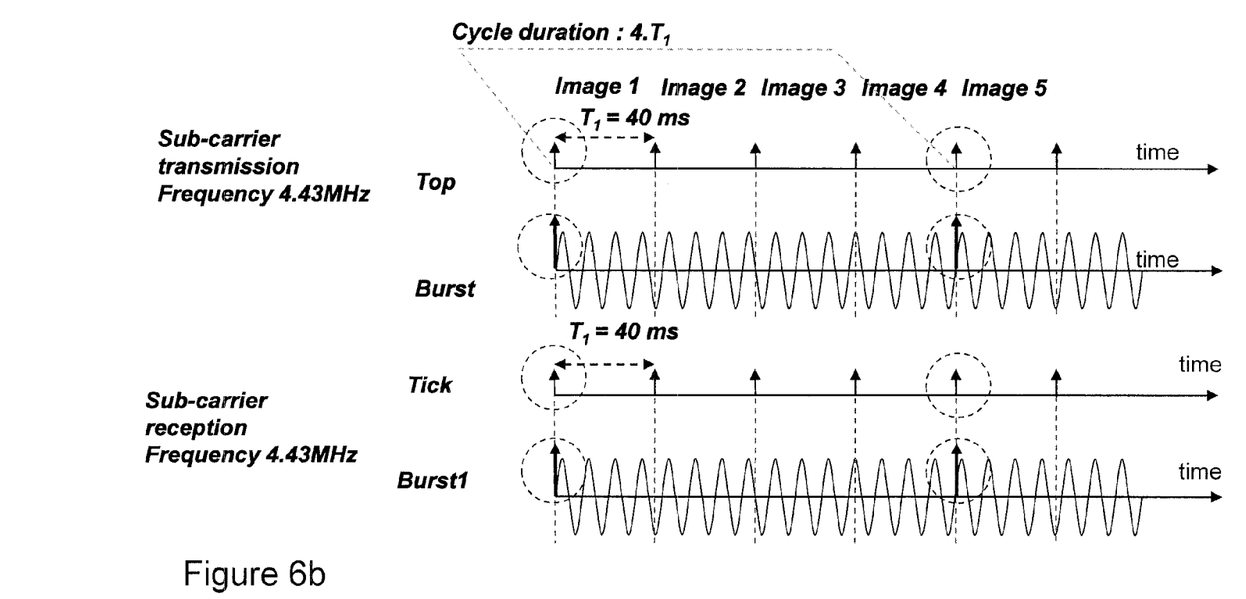
FIG. 6b, already described, presents the objective that the invention aims to reach, that is the production on the reception side of a sub-carrier perfectly synchronous and in phase with a sub-carrier on the transmission side, FIG. 7, regroups nine timing diagrams of the progression of signals produced by a reception device according to the invention.

FIG. 6b illustrates the asynchronism between the image rate represented by Top pulses marking the consecutive image starts, the period T1 and the sub-carrier that carries the coloured information on the images in question. FIG. 6b also represents the objective that is aimed for, that is to create a reception side of Top pulses synchronous with first pulses Tick and to create a sub-carrier on the reception side that is synchronous with the sub-carrier on the transmission side. T1, the duration separating two consecutive images has a value of for example 40 ms, the frequency of the sub-carrier on the transmission side is for example equal to 4.43 MHz (the number of oscillations of the sub-carrier that is shown is not representative). The frequency of the sub-carrier is imposed by the existing video standards.

Let it be considered that the sub-carrier has a null phase at the instant of a first Tick pulse. It is necessary to wait a duration equal to 4 consecutive images for the sub-carrier to resume the phase value that it had for this first pulse. It is hoped then to create a Burst pulse synchronous with Tick pulses with a period equal to 4 T1.

The problem to be resolved is therefore to reproduce on the reception side a Tick pulse and a pulse Burst1 so that the Top and Tick pulses on one hand and the Burst and Burst1 pulses on the other are perfectly synchronous and in phase.

Independently of this, the insertion of an audio component in a video stream (4.2.2) must respect a size in terms of the number of audio samples per image.

This size differs according to the frequency of audio samples. For example, for an audio sampling frequency of 48 kHz, 1920 audio samples must be inserted on each image at an image rate of 25 Hz. But the size that must be adapted to a great variety of configurations (image rate and audio sampling frequency) is not necessarily expressed for a unitary image number. Hence, for a frequency of 44.1 kHz and an image rate of 24 Hz, it will be necessary to share 3675 samples over 2 consecutive images.

The following table synthesises an example of a size to which a stream comprising a video component and an audio component must respond, according to the value of the image rate and the number of associated audio samples. According to the cases, the specification of the number of audio samples is given for 1, 2, 3, 5, 15, 80, and 100 consecutive images. This table is a synthesis of information found in the SMPRTE 299-2004M standard for HD video standards and in the SMPTE 272M standard for SD format images.

TABLE

Example of size in number of audio samples per number of consecutive images.

| Audio sampling frequency | Image rate (number of images per second) | | | | |
|---|---|---|---|---|---|
| | 30 | 30,001/1,001 | 25 | 24 | 24,00/1,001 |
| 48 kHz | 1600/1 | 8008/5 | 1920/1 | 2000/1 | 2002/1 |
| 44.1 kHz | 1470/1 | 14747/100 | 1764/1 | 3675/2 | 147147/80 |
| 32 kHz | 3200/3 | 16016/15 | 1280/1 | 4000/3 | 4004/3 |

Hence, to be able to insert audio samples in a synchronised manner with respect to the images, it is again beneficial to have a sub-carrier whose period can be equal to 1, 2, 3, 5, 15, 80, or 100 image periods.

One of the aims of the present invention is to generate on the reception side a sub-carrier in phase defined by the second pulses Burst1 in phase with the first pulses Tick. Two consecutive second pulses Burst1 being separated by an integer p of first pulses Tick, p being greater than 1. In addition this objective is aimed at without sending other samples on the network than those useful for the production of Tick pulses.

An aim of the invention is also to always generate on the slave Genlock side (or reception side), an audio/video sequence defined by a third pulse AV_PLSE1 that is in phase with the first pulse Tick. Two consecutive third pulses AV_PLSE1 being separated by an integer q of first pulse Tick, q being an integer greater than 1, the value of q being fixed according to a ratio between the number of audio samples and number of consecutive images (Fech_Audio/F_Image) imposed by the format of audio data and the images rate. Here again, the aim is to attain this objective without increasing the number of samples sent on the network.

SUMMARY OF THE INVENTION

The technical problem that the present invention proposes to resolve is to generate in addition to a first pulse Tick serving for example to synchronise a transport of images, second pulses Burst1, and third pulses AV_PLSE1 whose period corresponds to an integer p, q of pulses Tick. The second pulses Burst1 serve to produce a sub-carrier to generate a colour burst and the third pulses AV_PLSE1 serve to synchronise an audio sequence with the images.

For this purpose, the present invention concerns a device able to receive packets in a packet switching network, said device comprising:
the means INTR to receive packets from said network, said packets comprising $PCR_r$ samples, said $PCR_r$ samples coming from a sampling of a first counting ramp CSE_PCR having a range EX according to a sampling clock CLKech with a period of $T_{ech}$, said first counting ramp CSE_PCR being timed by a clock CLK_VID with a period T_VID, said means INTR to receive packets extracting said $PCR_r$ samples from received packets,
the means PLL to regenerate second counting ramps CSR_PCR with a range EX, the means PLL receiving the $PCR_r$ samples and also delivering local samples PCT_loc of second counting ramps CSR_PCR realised according to the sampling clock CLKech and a reconstituted clock CLK_out with the period T_VID, the counting ramps CSR_PCR being timed by a reconstituted clock CLK_out,
the means CPT to produce third counting ramps CPT_I timed by the reconstituted clock CLK_out and having a range EX_I where EX=m.EX_I, m being an integer greater than 1, the third counting ramps CPT_I being set to zero at each passage of the second counting ramp CSR_PCR by a fixed integer M comprised between 0 and EX−1,
the means CPT to produce first pulses Tick produced at each passage of the third counting ramp CPT_I by 0.

According to the invention it also comprises the means CPT to produce second pulses Burst1 synchronous with first pulses Tick and said second pulses Burst1 are separated by a fixed integer p of first pulses Tick, where the number p is a number greater than 1 and where the number m is an integer multiple of the number p.

Advantageously, it also comprises the means GEG to produce a synchronisation signal SG2 from said first pulses Tick and said second pulses Burst1.

Each first pulse Tick announces an image start.

Advantageously, the synchronisation signal SG2 comprises a reference to each image start and a sub-carrier corresponding to colour information of images based on second pulses Burst1.

Advantageously, the synchronisation signal SG2 conforms to the SMPTE318M-B standard.

A first advantage of the invention is the capacity that it offers to generate a Genlock synchronisation signal comprising a sub-carrier corresponding to a colour burst that is indispensable to maintain a compatibility with the Genlock signals employed today to synchronise in particular production studio image taking equipment.

A second advantage of the invention is that it remains completely compatible with inventions described in previous applications such as for example the international PCT application FR2007/050918.

Advantageously, the device according to the invention also comprises the means CPT to produce third pulses AV_PLSE1 synchronous with first pulses Tick and said second pulses Burst1 are separated by a fixed integer q of first pulses Tick where the number q is an integer greater than 1 other than p and where the number m is a integer multiple of the number q.

Advantageously, the synchronisation signal SG2 conforms to the SMPTE318M-B standard.

Advantageously, the synchronisation signal SG2 comprises a reference to each image start and information to insert audio samples associated with images based on third pulses AV_PLSE1.

An additional advantage of the invention is that it allows the generation of a Genlock synchronisation signal also comprising a 10 frame or 5 image identification signal in accordance with the SMPTE 318M-B standard with the aim of facilitating the interoperability with audio/video equipment and in particular the synchronisation of audio samples insertion in a bitstream 4:2:2 on an IP network.

Advantageously, the synchronisation signal SG2 comprises a reference to each image start and status information associated with audio channels at AES-3-2003 standard based on said third pulses AV_PLSE1.

BRIEF DESCRIPTION OF THE DRAWINGS

The invention will be better understood from the following description of an embodiment of the invention provided as an example by referring to the annexed figures, wherein.

DETAILED DESCRIPTION OF THE EMBODIMENTS OF THE INVENTION

Figure 7:
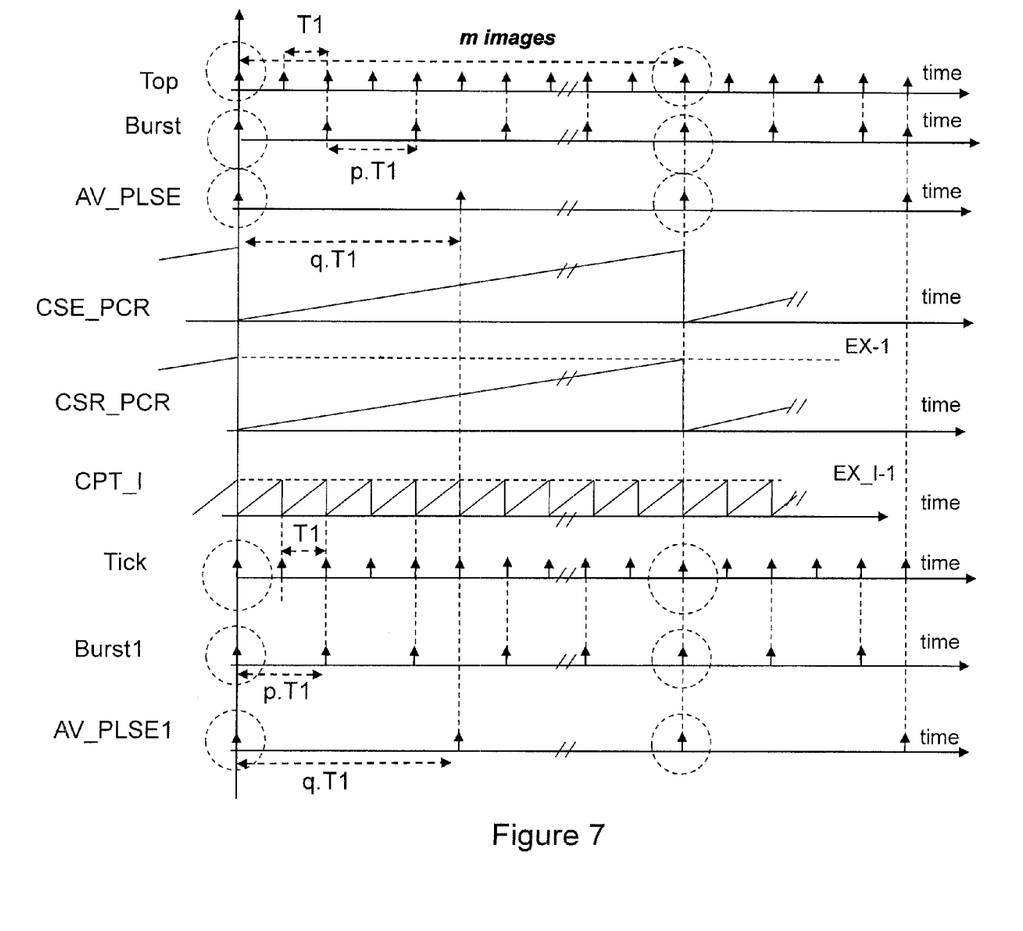

FIG. 7 regroups, in addition to the five timing diagrams of progression already shown in FIG. 5, two diagrams of the progression of pulses Burst and Burst1 as well as two diagrams of the progression of pulses AV_PLSE and AV_PLSE1.

The pulses Burst are representative of a first sub-carrier on the transmission side, used for example to carry colour information. A first Burst pulse is synchronous with a first pulse Top on the transmission side. The period of Burst pulses is equal to p.T1, or here 2.T1.

Moreover, the pulses AV_PLSE are used to insert audio information in a synchronous way in images transported according to the rate marked by the Top pulses. The period of pulses AV_PLSE is q.T1, or here 5.T1.

In the same way as in FIG. 5, the counting ramps CSE_PCR that are produced have a range equal to EX and a period corresponding to m Top consecutive pulses, that is to say that CSE_PCR has a period equal to m.T1, m being an integer greater than 1.

On the reception side, a CSR_PCR counting ramp, with a range also equal to EX is generated in phase with a CSE_PCR counting ramp, and CPT_I counting ramps having a range of EX_I where EX=m.EX_I are produced from each passage of the CSR_PCR counting ramp through a fixed integer value M comprised between 0 and EX, here M is equal to 0.

After a CSE_PCR passage through the value M, approximately m consecutive CPT_I counting ramps are produced. At each new CSE_PCR passage through the value M, the CPT counter is reset to 0 and a new sequence of CPT_I ramps is produced. The production of Tick pulses is triggered by the passages of CPT_I counting ramps through a fixed value N comprised between 0 and EX_I−1, here N is equal to 0.

The first pulses Burst1 and third pulses AV_PLSE1 (noted on FIG. 7 by circles and dotted lines) are produced following each passage of the counting ramp through the value M=0.

The device according to the invention comprises the means CPT to produce these second pulses Burst1 synchronous with first pulses Tick where the second pulses Burst1 are separated by an integer p of Tick pulses, and where the number m is an integer multiple of the number p.

An embodiment of such means CPT is described hereafter, for a specific case M=N=0:

The means CPT produces a "first" Burst1 pulse at an instant determined from a simultaneous passage of CSR_PCR through the value M=0 and a passage of CPT_I through the value N=0, later second pulses Burst1 are produced by counting p first pulses Tick.

Then, while the criteria to produce a new first Burst1 pulse is still not satisfied, the means CPT counting a number p of first pulses Tick and producing a second pulse Burst1 in a synchronous manner with this $p^{th}$ first pulse Tick.

The device according to the invention comprises the means CPT to produce third pulses AV_PLSE1 synchronous with first pulses Tick where the third pulses AV_PLSE1 are separated by an integer p of first pulses Tick, and where the number m is an integer multiple of the number p. The means CPT produce the third pulses AV_PLSE1 in a similar way to that used to produce the third pulses Burst1: from a "first" pulse AV_PLSE1, later third pulses AV_PLSE1 are produced including q first pulses Tick.

This principle can also be extended to the synchronisation of information of statuses associated with each audio channel in the AES signal (see the AES3-2003 standard. "AES standard for digital audio—Digital input-output interfacing—Serial transmission format for two-channel linearly represented digital audio data".

These items of information, 24 bytes in total, are transmitted at one bit per audio sample and thus form a repetition block structure whose period has a value of 192 audio sampling periods. Considering the audio sampling frequency ration and the video rhythm, for example that indicated in Table 1, it is possible to also associate an integer of audio statuses data block with an integer of image periods and thus synchronise the insertion of such data at any point in the network.

For example for an image frequency of 25 KHz, an audio sampling frequency of 48 KHz, there are 10 "path statuses" blocks of data per image (p1=1). For a video image frequency of 24 Hz and an audio sampling frequency of 48 KHz there are 125 blocks divided over 12 consecutive images (p2=12).

Advantageously, the device according to the invention comprises the means to store a set of Y values $[p_1, p_2, \ldots, p_y]$ where Y is an integer greater than 1 and the means to determine a value p from among the values [p1, p2, . . . , pY].

Advantageously, the value of the number m is an integer multiple of the smallest common multiple of values $[p_1, p_2, \ldots, p_r]$.

Similarly, so that the device according to the invention is compatible with all requirements set forth in table 1 shown above, it would be advantageous that value of number m would be equal to an integer multiple of the smallest common multiple of potential q values: 2, 3, 5, 80, 100. That is an integer multiple of 1200. Therefore, depending on chosen images format, it would be possible to generate third pulses AV_PLSE separated with 2, 3, 5, 80, or 100 periods T1.

Advantageously, the device according to the invention comprises the means to store a set of Z values $[q_1, q_2, \ldots, q_z]$ where Z is an integer greater than 1 and the means to determine a value q from among the values $[q_1, q_2, \ldots, q_z]$.

It is advantageous that the number m of Top pulses to consider for generating counting slopes CSE_PCR and CSR_PCR is an integer multiple of the smallest common multiple of consecutive images, here p and q, to consider for generating pulses: Burst, AV_PLSE, Burst1, AV_PLSE1. For following example shown on FIG. 7, it would be advantageous that m is equal to a multiple of 10 (i.e. smallest common multiple of p=2 and of q=5 is equal to 10).

This m value allows also to the device according to the invention to deliver pulses Burst1 with p=4, because the smallest common multiple of 2, 3, 5, 80, 100 and 4 is still equal to 4.

Advantageously, the value of the number m is an integer multiple of the smallest common multiple of values $[p_1, p_2, \ldots, p_Y, q_1, q_2, \ldots, q_Z]$.

To select a value for m, account must also be taken of restrictions related to the convergence speed of the PLL loop. Trials have shown that a value of m greater than 2000 is desirable.

Advantageously, the value of the number m is greater than 2000.

Advantageously, the value of m is equal to 2400.

The invention has been described above purely by way of example. It is understood that those skilled in the art are capable of producing variants of the invention without leaving the scope of the patent.

The invention claimed is:

1. Device able to receive packets circulating on a packet switching network, said device comprising:
    means to receive packets from said network, said packets comprising samples, said samples coming from a sampling of a first counting ramp having a range EX according to a sampling clock with a period $T_{ech}$, said first counting ramp being timed by a clock with a period T_VID, said means to receive extracting said samples from said received packets,
    means to regenerate second counting ramps having the range EX, the means to regenerate receiving the samples and also delivering local samples of second counting ramps realised from a sampling clock and a reconstituted clock with the period T_VID, the second counting ramps being timed by the reconstituted clock,
    means to produce third counting ramps timed by the reconstituted clock and having a range EX_I where EX=m.EX_I, m being an integer greater than 1, the third counting ramps being set to zero at each passage of the second counting ramp by 0,
    means to produce a first signal consisting of first pulses at each passage of the third counting ramps by 0,
    wherein it also comprises means to produce a second signal, different from the first signal, consisting of second pulses synchronous with first pulses and wherein said second pulses are separated by a fixed number p of first pulses, where the number p is an integer greater than 1 and where the number m is an integer multiple of the number p.

2. Device according to claim 1, wherein it further comprises means to produce third pulses synchronous with said first pulses and wherein said third pulses are separated by a fixed integer q of first pulses, where the number q is an integer greater than 1 and other than p, and where the number m is an integer multiple of the number q.

3. Device according to claim 2, wherein it also comprises means to produce a synchronisation signal from said first pulses and said third pulses.

4. Device according to claim 3, wherein each first pulse announces an image start and in that the synchronisation signal comprises a reference to each image start and information to insert audio samples associated with said images based on said third pulses.

5. Device according to claim 4, wherein the indications to insert the audio samples are in accordance with the SMPTE299M standard and the SMPTE 272M standard.

6. Device according to claim 2, wherein it comprises a means to store a set of Z values $[q_1, q_2, \ldots, q_z]$ and a means to determine a value q from among the values $[q_1, q_2, \ldots, q_z]$ wherein Z is an integer greater than 1.

7. Device according to claim 6, wherein the value of the number m is an integer multiple of the smallest common multiple of values $[p_1, p_2, \ldots, p_Y, q_1, q_2, \ldots, q_Z]$.

8. Device according to claim 1, wherein it also comprises means to produce a synchronisation signal from said first pulses and said second pulses.

9. Device according to claim 1, wherein each first pulse announces an image start and wherein the synchronisation signal comprises a reference to each image start and a sub-carrier corresponding to the colour information of said images based on said second pulses.

10. Device according to claim 9, wherein the synchronisation signal is in accordance with the SMPTE318M-B standard.

11. Device according to claim 2, wherein each first pulse announces an image start and in that the synchronisation signal comprises a reference to each image start and the statuses information associated with the audio channels to the AES-3-2003 standard based on said third pulses.

12. Device according to claim 1, wherein it comprises a means to store a set of Y values $[p_1, p_2, \ldots, p_Y]$ corresponding to a period of audio samples expressed in a number of consecutive image available in the audio standard and a means to determine a value p from among the values $[p_1, p_2, \ldots, p_Y]$, wherein Y is an integer greater than 1.

13. Device according to claim 12, wherein the value of the number m is an integer multiple of the smallest common multiple of values $[p_1, p_2, \ldots, p_Y]$.

14. Device according to claim 1, wherein the value of the number m is greater than 2000.

15. Device according to claim 1, wherein the value of the number m is equal to 2400.

16. A method for receiving packets circulating on a packet switching network, comprising:
    receiving packets from said network, said packets comprising samples, said samples coming from a sampling of a first counting ramp having a range EX according to a sampling clock with a period $T_{ech}$, said first counting ramp being timed by a clock with a period T_VID, wherein said receiving includes extracting said samples from said received packets;
    regenerating second counting ramps having the range EX, wherein said regenerating includes receiving the samples and also delivering local samples of second counting ramps realised from a sampling clock and a reconstituted clock with the period T_VID, the second counting ramps being timed by the reconstituted clock;
    producing third counting ramps timed by the reconstituted clock and having a range EX_I where EX=m.EX_I, m being an integer greater than 1, the third counting ramps being set to zero at each passage of the second counting ramp by 0;
    producing a first signal consisting of first pulses at each passage of the third counting ramps by 0; and
    producing a second signal, different from the first signal, and consisting of second pulses synchronous with said first pulses, such that said second pulses are separated by a fixed number p of first pulses, wherein the number p is an integer greater than 1 and the number m is an integer multiple of the number p.

* * * * *